(No Model.)
S. JOHNSON.
SEWER GATE.
No. 289,107. Patented Nov. 27, 1883.
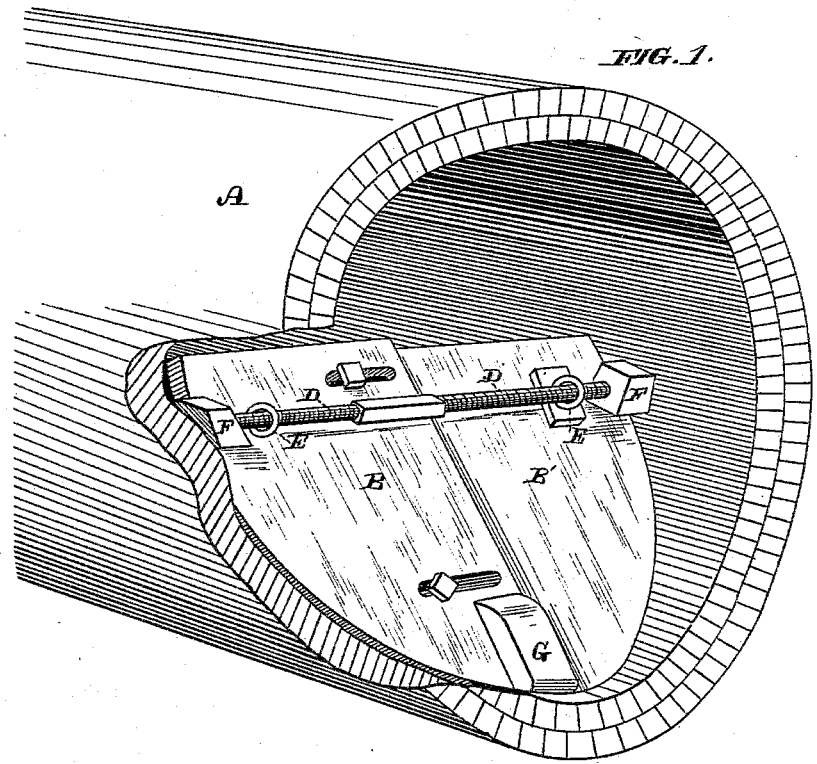
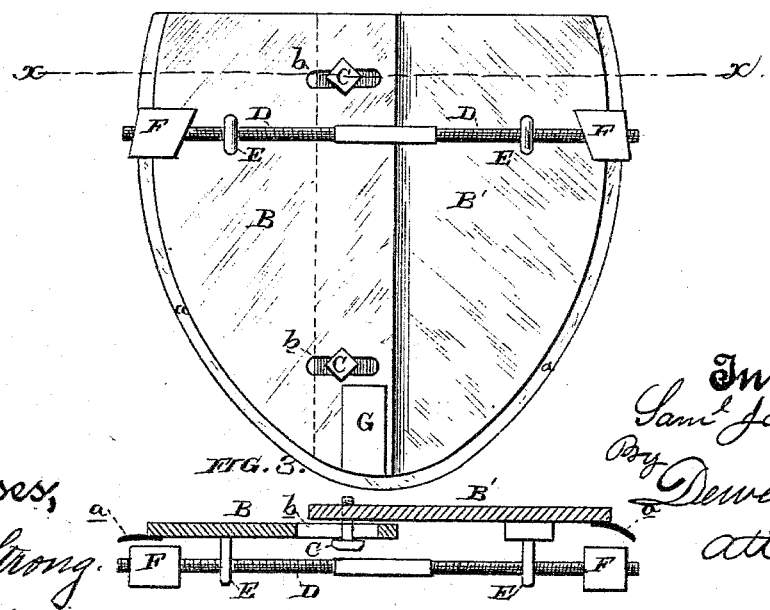
Witnesses:
Geo. H. Strong.
J. H. Rouse.
Inventor
Sam'l Johnson
By Dewey & Co.
Attorneys

UNITED STATES PATENT OFFICE.

SAMUEL JOHNSON, OF SAN FRANCISCO, CALIFORNIA.

SEWER-GATE.

SPECIFICATION forming part of Letters Patent No. 289,107, dated November 27, 1883.

Application filed February 5, 1883. (No model.)

*To all whom it may concern:*

Be it known that I, SAMUEL JOHNSON, of the city and county of San Francisco, State of California, have invented an Improved Sewer-Gate; and I hereby declare the following to be a full, clear, and exact description thereof.

My invention relates to a gate which is designed for temporarily checking the flow of water in sewers; and it consists of two sections overlapping each other at or near the center, and with a means for adjusting, so that their edges will fit the walls of the sewer. A rod or bar having its outer ends threaded with right and left screws, respectively, extends across the back of the gate, and large nuts fit the screws upon its opposite ends. The outer faces of the nuts are beveled, so that when forced outward by turning the screw they will bind against the walls of the sewer and hold the gate firmly in place.

Referring to the accompanying drawings for a more complete explanation of my invention, Figure 1 is a view of a part of a sewer, showing my gate in place. Fig. 2 is a back view of the gate, supporting nuts and rod, and adjusting devices. Fig. 3 is a sectional view on the line $x\ x$ of Fig. 2.

A is a sewer, with a part of one side broken away to show the interior.

B B' are the two halves of the gate, which have their exterior edges shaped to fit approximately the interior contour of the sewer. These edges have strips or flaps $a$, of rubber, leather, or other suitable elastic material, attached to them, to close against the sides of the sewer when the gate is fixed in place, and make a tight joint by the pressure of the water upon them. The leaves B B' of the gate overlap in a vertical line near the center, one of the leaves having bolts C near the top and bottom, while the other is slotted horizontally, as shown at $b$, to allow the bolts to pass through. The heads of the bolts are large, or they may screw down upon washers, so as to unite the two parts into a solid gate.

When this gate is to be introduced into the sewer through a man-hole, the bolts are removed and the two parts introduced separately, after which they are again put together. The outer edges being adjusted to fit the sewer sides, the bolts may be tightened and the whole made rigid. In order to secure the gate in the sewer, an iron rod or bar, D, extends across its back, passing through guides or staples E, as shown, and may be made angular near the center, or have a hole to receive a lever-bar by which to turn it. At the ends of this bar screw-threads $c$ are cut, those at one end being right while those at the other end are left hand threads. Long blocks F have corresponding threads cut within them, so that they form nuts which fit the ends of the rod. As the rod is not quite as long as the diameter of the sewer, these blocks serve as extensions, and their ends are beveled, so as to approximately fit the sides of the sewer, so that when the rod is turned the screws on each end force the nuts outward until they bind against the sides of the sewer, and thus hold the gate firmly in place. The gate is usually fixed at an incline, as shown, and a weight, G, is secured at its lower edge to prevent the water from causing it to float up until a sufficient amount has accumulated to hold it down by direct pressure. When desired, it may be turned up about the rod as an axis, to allow the accumulated water to rush out; or it may be entirely removed by turning the rod back until the nuts are loosened.

This gate is easily adjusted to sewers of different widths and height where the contour of the lower part is similar, and will make a tight dam at any desired point.

Having thus described my invention, what I claim as new, and desire to secure by Letters Patent, is—

1. A sewer-gate consisting of the two vertically-divided halves or sections having their outer edges approximating to the contour of the sewer, and provided with the flaps $a$, said sections overlapping each other at the center and united by bolts C, substantially as herein described.

2. The two-part gate fitted to the interior of a sewer, the parts being adjustable upon each other by means of the bolts C and the slots $b$, substantially as herein described.

3. The sewer-gate composed of the parts B B', with the slots and uniting-bolts, as shown, in combination with the transverse rod D, having right and left screw-threads upon opposite ends, and the corresponding blocks or nuts F, substantially as herein described.

4. A sewer-gate consisting of two vertically-divided halves or sections, in combination with the bar or rod D, having right and left screw-threads on opposite ends, and nuts or blocks F, fitting on these ends, substantially as and for the purpose set forth.

In witness whereof I hereunto set my hand.

SAMUEL JOHNSON.

Witnesses:
S. H. NOURSE,
G. W. EMERSON.